United States Patent [19]

Robertson

[11] Patent Number: 4,481,130
[45] Date of Patent: Nov. 6, 1984

[54] METHOD FOR DEMULSIFYING WATER-IN-OIL EMULSIONS

[75] Inventor: David S. Robertson, Ashford, England

[73] Assignee: The British Petroleum Company Limited, London, England

[21] Appl. No.: 386,111

[22] Filed: Jun. 7, 1982

[30] Foreign Application Priority Data

Jun. 24, 1981 [GB] United Kingdom ............. 8119466

[51] Int. Cl.³ ............................................. B01D 17/04
[52] U.S. Cl. .................................... 252/328; 210/708; 210/710; 252/331; 252/349
[58] Field of Search ............... 252/328, 331, 349; 210/710, 708

[56] References Cited

U.S. PATENT DOCUMENTS

| | | | |
|---|---|---|---|
| 1,802,090 | 4/1931 | Roberts | 252/328 |
| 2,507,910 | 5/1950 | Keiser et al. | 252/331 |
| 3,301,328 | 1/1967 | Campion | 252/331 X |
| 3,512,570 | 5/1970 | Ess et al. | 252/349 X |
| 4,057,223 | 11/1977 | Rosenberger | 366/172 |

FOREIGN PATENT DOCUMENTS 2060683A  5/1981  United Kingdom .
781210   11/1980  U.S.S.R. .

Primary Examiner—Richard D. Lovering
Attorney, Agent, or Firm—Morgan, Finnegan, Pine, Foley & Lee

[57] ABSTRACT

A method for continuously demulsifying a viscous, stable water-in-oil emulsion, which emulsion comprises from 50 to 80% water as the dispersed phase, comprises passing the emulsion and a chemical demulsifier through a mixing device having at least one flow restriction and recycling part of the mixture leaving the mixing device back to the device at or upstream of the restriction.

6 Claims, 3 Drawing Figures

METHOD FOR DEMULSIFYING WATER-IN-OIL EMULSIONS

This invention relates to a method for demulsifying water-in-oil emulsions.

The majority of crude oils, as well as some fuel oils, will if spilt on water, form a relatively stable, viscous water-in-oil emulsion, under suitable conditions. The rate of formation and physical characteristics of the water-in-oil emulsion, commonly known as "chocolate mousse", will be dependent upon the intensity and duration of agitation and the temperature of the oil and water mixture. Emulsions will be formed even under calm sea conditions of low wind and seastate, given sufficient time, and once formed are difficult to recover and handle. The inevitable time lag between the occurrence of an oil spill and the completion of the recovery operations means that the problems of removing and disposing of water-in-oil emulsions are frequently encountered at oil spill incidents, particularly when the oil spillage occurs at sea.

Recovery of "chocolate mousse" usually involves subjecting the emulsion to shearing e.g. pumping the emulsion from a recovery device to storage. The "chocolate mousse" is shear thinning and so it appears quite fluid whilst it is actually being pumped. However, the shearing action results in an increase in the apparent viscosity and stability of the water-in-oil emulsion due, it is thought, to the shearing causing a reduction in the size of the water droplets. Thus, transfer operations result in the water-in-oil emulsion becoming more difficult to handle and more difficult to demulsify. It is preferable, therefore, to break the emulsion at an early stage in the recovery operation. Also, storage capacity for recovered material is usually limited at the site of an oil spill and so it is preferable to break the emulsion, which may contain up to 80% by volume of water, so that the water may be separated from the oil.

The water-in-oil emulsions may be broken by the addition of a suitable chemical demulsifier. However, since the emulsion may have up to 80% by volume of water as the dispersed phase, the demulsifier must be intimately mixed with the mousse in order to break the emulsion. The high viscosity of the emulsion makes it difficult to disperse the demulsifier throughout the emulsion. There is therefore a need for a continuous method for breaking viscous water-in-oil emulsions.

According to the present invention a method for demulsifying a water-in-oil emulsion which emulsion comprises from 50 to 80% by volume of water as the dispersed phase comprises passing the water-in-oil emulsion and a chemical demulsifier through a mixing device having at least one flow restriction and recycling part of the mixture leaving the mixing device back to the device at, or upstream of, the restriction.

The water-in-oil emulsion may be associated with an amount of free water. The free water may be water recovered with the emulsion or may be added to the emulsion before it is passed through the mixing device. The oil in the emulsion may be crude oil or a petroleum product.

Preferably the chemical demulsifier is added to the water-in-oil emulsion and the mixture introduced into the mixing device.

The mixing device may comprise a single restriction e.g. a nozzle or a venturi tube or may comprise at least two restrictions such as, for example, a nozzle through which the emulsion and demulsifier passes and a venturi tube through which the emulsion, demulsifier and the recycled material passes.

Any chemical demulsifier which is capable of breaking a viscous water-in-oil emulsion may be used in the present invention. Suitable demulsifiers are those which contain ethylene oxide and propylene oxide co-polymers or block co-polymers and which may also contain sulpho-succinates. Particularly suitable demulsifiers are Unisperse M74, and M75 supplied by Universal-Matthey Products Limited. "Unisperse" is a Registered Trade Mark.

The particular demulsifier, and its concentration, for use in a given situation will be selected according to such factors as the temperature and composition of the oil and the amount of free water associated with the emulsion.

Preferably the concentration of the demulsifier in the emulsion entering the mixing device is greater than 250 ppm by volume and more preferably it is in the range 500–1,000 ppm by volume.

The ratio of the recycle flowrate to the flowrate of the emulsion and demulsifier is preferably greater than 1:1. However, for practical reasons the ratio of the recycle flowrate to the emulsion and demulsifier flowrate is preferably less than 10:1.

BRIEF DESCRIPTION OF THE DRAWINGS

Apparatus suitable for use in the present invention is illustrated with reference to the accompanying drawings in which;

FIG. 1 is a cross-sectional side elevation of an embodiment of the mixing device which comprises two restrictions, viz a venturi tube 1 and a feed inlet nozzle 2. A recycle inlet 3 is positioned upstream of the restriction in the venturi tube 1.

FIG. 2 is a cross-sectional side elevation of an alternative embodiment of the mixing device which comprises a venturi tube 1, a feed inlet 14 and a recycle inlet 3 which is positioned at the throat of the venturi tube 1. Thus, this embodiment comprises only one restriction.

Figure 3:
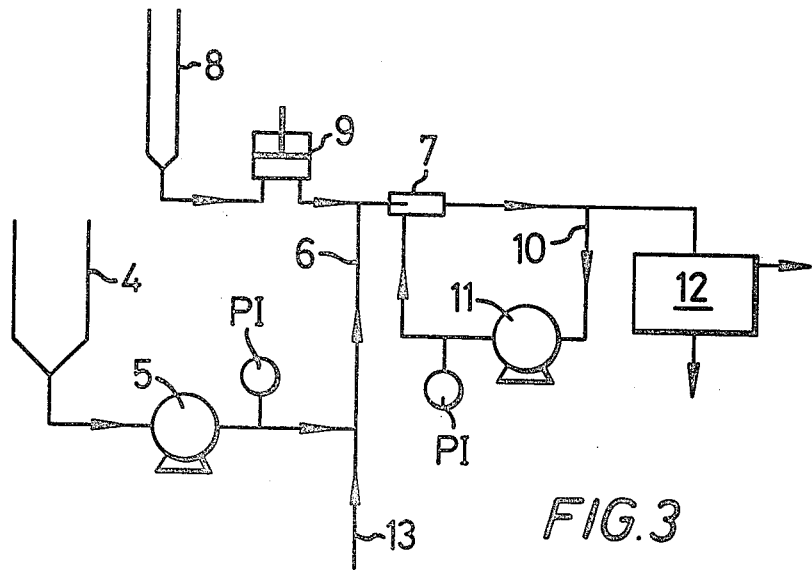
FIG. 3 is a flow diagram of an arrangement of the apparatus for carrying out the method of the present invention. The symbol PI in FIG. 3 designates a pressure indicator.

A suitable arrangement of apparatus for the continuous demulsification of a water-in-oil emulsion is shown in FIG. 3. The performance of the demulsification process is independent of fluctuations in the feed flowrate and so the water-in-oil emulsion could be treated as it is recovered. However, it may be desirable to store the recovered emulsion temporarily in a tank 4 in order to even out the flowrate to the oil-water separator. The emulsion is pumped by feed pump 5 through line 6 to the mixing device 7. The chemical demulsifier is stored in tank 8 and added to the water-on-oil emulsion before it enters the mixing device 7. The dosing pump 9 may either supply the demulsifier at a constant flowrate or may be automatically controlled to vary the supply of the demulsifier according to the flowrate of the emulsion so that the concentration of demulsifier in the emulsion remains relatively constant. The mixture of the emulsion and demulsifier are fed into the mixing device 7. On leaving the mixing device 7 part of the mixture is recycled via line 10 and recycle pump 11, while the remainder passes on to an oil/water separator 12. The recycled material enters the mixing device through the recycle inlet 3. Preferably the ratio of the recycle flowrate to the feed flowrate is greater than 1:1. Therefore the apparatus may conveniently be operated with a constant recycle flowrate such that the recycle ratio is a minimum of 1:1 at the maximum feed flowrate.

The demulsifier is therefore dispersed throughout the emulsion by forcing the mixture through the constriction or constrictions in the mixing device 7. For example, in the mixing device shown in FIG. 1 the emulsion feed and demulsifier is pumped through the feed inlet nozzle 2 and then passes through the venturi tube along with the recycled material. The pressure drop over the mixing device may be of the order of 2 bar or less at the designed maximum flowrate.

Surprisingly therefore the continuous emulsion breaking process is essentially a mixing process. The high shear rates at the restrictions will significantly reduce the viscosity of the emulsion and thereby aid the dispersion of the demulsifier. The recycled material will be at least partially demulsified and so there will be a relatively large amount of free water. This free water may assist the breaking of the emulsion by forming a mousse-in-water dispersion. It may be advantageous to have some free water associated with the water-in-oil emulsion fed to the mixing device. In most recovery operations the water-in-oil emulsion is picked up with free water but more may be easily added if required. In FIG. 3 additional water may be added to the "mousse" via line 13. Preferably therefore the emulsion breaking step is carried out before free water is separated from the water-in-oil emulsion.

The invention will now be illustrated by reference to the following examples.

EXAMPLE 1

A water-in-oil emulsion having a water content of approximately 80% by volume was produced by adding 10% by volume of Kuwait crude oil to 90% by volume of mains water and stirring the mixture for approximately 48 hours and separating the emulsion from the remaining free water.

Figure 1:
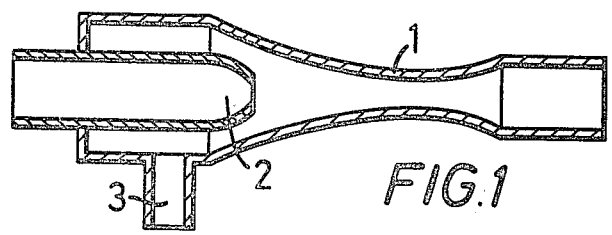
FIG. 1 is a cross-sectional side elevation of an embodiment of the mixing device comprising two restrictions.
Figure 2:
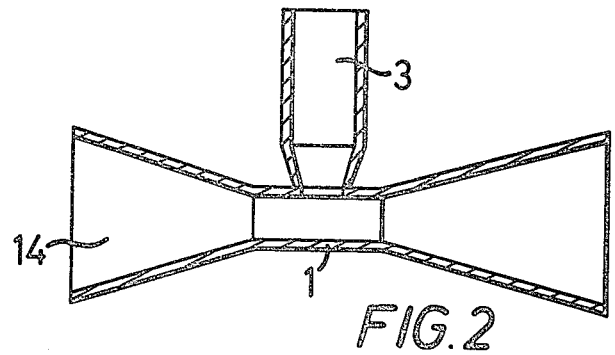
FIG. 2 is a cross-sectional side elevation of an alternative embodiment of the mixing device comprising a single restriction.

The apparatus used to break the emulsion was similar to that shown in the FIGS. 1 and 3. The artificially produced "chocolate mousse" was placed in the storage tank 4 and a chemical demulsifier, Unisperse M75, was placed in tank 8. 50% by volume of free water was added to the "mousse" and 1000 ppm of the demulsifier was added to the emulsion/water mixture which was then passed through the mixing device. The recycle ratio was 3.3:1. A sample of the demulsified product was collected in a measuring cylinder and allowed to separate by gravity. The rate at which the oil and water separated was recorded. After 5 minutes, 98% by volume of the emulsified water had been separated from the water-in-oil emulsion.

EXAMPLE 2

Example 1 was repeated except that the ratio of the recycle flowrate to the feed flowrate was 1.2:1. After 5 minutes, 90% by volume of the emulsified water had separated from the emulsion.

Both examples show that the invention provides an effective method for continuously demulsifying "chocolate mousse".

I claim:

1. A method for demulsifying a water-in-oil emulsion, which emulsion comprises 50 to 80% by volume of water as the dispersed phase, comprising passing the water-in-oil emulsion and a chemical demulsifier through a mixing device having at least one flow restriction and recycling part of the mixture leaving the mixing device back to the device at, or upstream of the restriction, the ratio of the recycle flowrate to the flowrate of the emulsion and demulsifier being from 1:1 to 10:1.

2. A method as claimed in claim 1 wherein the pressure drop over the mixing device is 2 bar or less.

3. A method is claimed in claim 1 wherein the mixing device comprises a single restriction which is a nozzle or a venturi tube.

4. A method as claimed in claim 1 wherein the mixing device comprises two restrictions which are a nozzle through which the emulsion and demulsifier passes and a venturi through which the emulsion, demulsifier and recycled material passes.

5. A method as claimed in claim 1 wherein the amount of demulsifier is at least 250 ppm by volume of the emulsion.

6. A method as claimed in claim 5 wherein the amount of demulsifier is from 500–1000 ppm by volume of the emulsion.

* * * * *